July 10, 1962 C. M. PETERS 3,043,331
PRESSURE CONTROLLER
Filed April 12, 1956 2 Sheets-Sheet 1

CLIFFORD M. PETERS
*INVENTOR.*

BY

ATTORNEY

July 10, 1962

C. M. PETERS 3,043,331

PRESSURE CONTROLLER

Filed April 12, 1956

CLIFFORD M. PETERS
*INVENTOR.*

BY

ATTORNEY

United States Patent Office 3,043,331
Patented July 10, 1962

3,043,331
PRESSURE CONTROLLER
Clifford M. Peters, Longview, Tex., assignor to U.S. Industries, Inc., New York, N.Y., a corporation of Delaware
Filed Apr. 12, 1956, Ser. No. 577,753
11 Claims. (Cl. 137—458)

This invention relates to an apparatus for changing the pressure applied to a device each time a controlled pressure rises above or falls below predetermined maximum and minimum values. In another of its aspects, it relates to a pressure actuated pilot valve for controlling the application of pressure to a pressure actuated device. In still another of its aspects, it relates to a system wherein the opening and closing of a control valve can be controlled from a point remote therefrom simply by regulating the pressure in a conduit in which the control valve is situated.

In the past, various apparatus has been suggested for causing a control valve to close whenever a controlled pressure rises above a predetermined maximum value or falls below a predetermined minimum value. Of course, the general purpose of such apparatus is to stop flow through a conduit whenever the pressure in the conduit becomes either too high or too low. One difficulty with any such prior apparatus is that it does not provide any automatic means for reopening the control valve when the line pressure returns to be within the range between the maximum and minimum values. Thus, the opening of the control valve is effected by a manual operation. As a result, it is necessary for an operator to go to the control valve and open the same each time it had closed.

In some of the prior art apparatus of this type, the pressure medium used to close the control valve is continuously bled to the atmosphere while the control valve is closed or, in some cases, while the control valve is in both open and closed positions. Such continuous bleeding is not only wasteful of control fluid but may not be permissible as where the control fluid is inflammable, such as natural gas, or is available in only limited supply.

It is an object of this invention to provide an apparatus for controlling the application of pressure to a pressure actuated mechanism wherein the apparatus will automatically cause the mechanism to be actuated each time a controlled pressure passes without a predetermined range and also each time the controlled pressure returns to be within such range.

Another object is to provide such an apparatus which will close a control valve each time a controlled pressure rises above or falls below maximum and minimum values, respectively, and will also automatically reopen the control valve when the controlled pressure increases or decreases, as the case may be, to be within the range defined by said maximum and minimum values, whereby both opening and closing of the control valve is responsive to control pressure fluctuations.

Another object is to provide such an apparatus wherein high and low pressure pilot valves are actuated by a controlled pressure to control the application of a control fluid to a pressure-operated device or valve, the arrangement being such that actuation of either pilot valve by excessively high or low controlled pressures, respectively, causes venting of the pressure-operated device and interruption of flow of control fluid thereto so that the only control fluid vented is that necessary to reduce the pressure on the pressure-operated device or valve.

Another object is to provide such an apparatus wherein the pilot valves automatically move to non-venting position when the controlled pressure returns to be within a predetermined range and thereupon automatically causing the application of control pressure to the pressure operated device or valve.

Another object is to provide a pilot valve having pressure responsive means for actuating the same, the pressure responsive means having different sized effective areas thereon so that the effective area employed can be readily changed to give the valve a wide operating range.

Another object is to provide such a pilot valve in which the effective area can be changed merely by opening and closing a passageway.

Another object is to provide a system in which a valve controlling flow through a conduit can be remotely opened and closed by merely increasing or decreasing the pressure in the conduit by manipulation of a device located at a point remote from the controlling valve.

Another object is to provide such a system wherein the opening of one valve in a flow conduit causes opening of another valve in the same conduit, and vice versa, the sole connection between the two valves being the conduit itself.

Other objects, advantages and features of this invention will be apparent to one skilled in the art upon a consideration of the written specification, the appended claims and the attached drawings wherein:

Like characters of reference are used throughout the several views to designate like parts.

Figure 1:
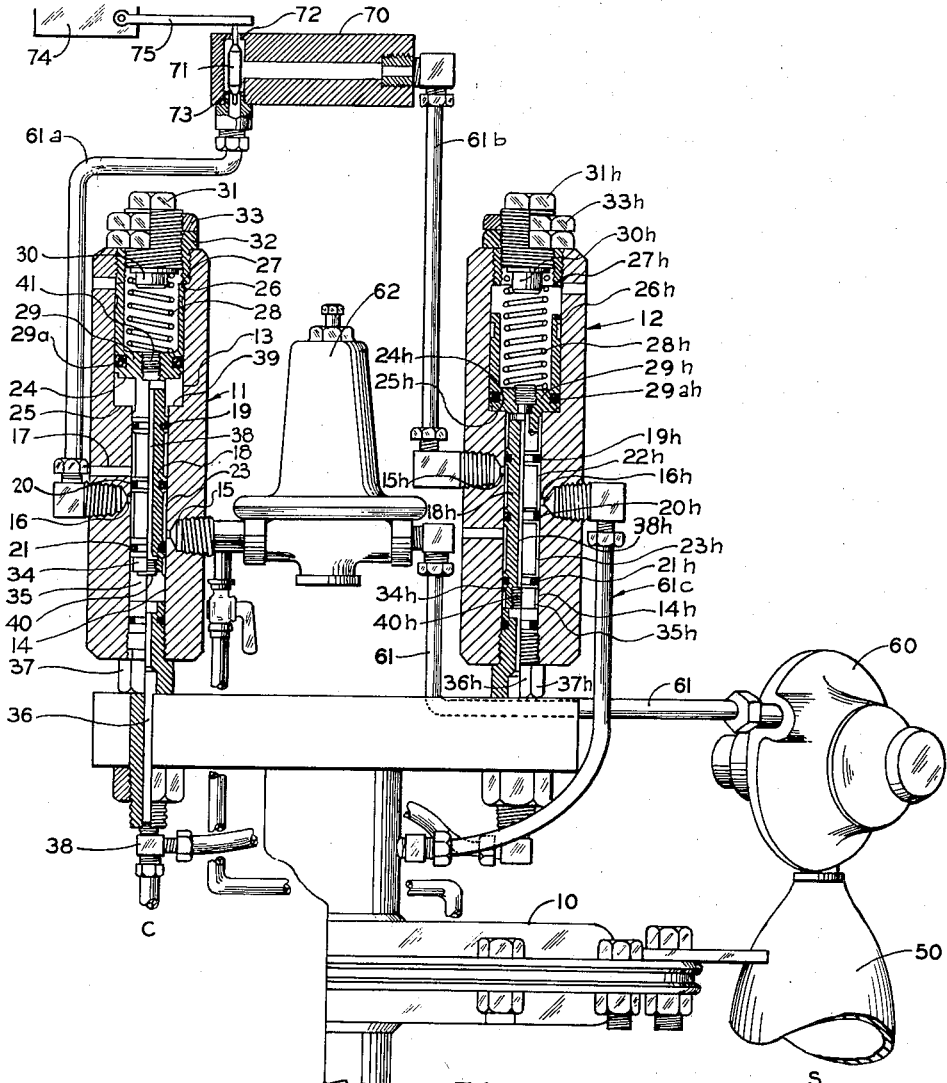
FIG. 1 illustrates one embodiment of the apparatus of this invention mounted upon a motor valve to control opening and closing of the same, the parts being in position to cause the application of a control pressure to the motor valve.

Referring now to FIG. 1, there is illustrated a conventional diaphragm type motor valve 10, the opening and closing of which is controlled by a low pressure pilot 11 and a high pressure pilot 12. In general, the arrangement is such that the pressure of control fluid from source S is applied in series through both the high and low pressure pilots to the motor valve as long as controlled pressure fluid from C is within a range defined by predetermined maximum and minimum values. However, should pressure C fall below the minimum value, low pressure pilot 11 will cut off the control fluid from S being applied to the motor valve and vent the latter so that it can close. As soon as pressure C increases to be above the minimum value, pilot valve 11 will move to non-venting position so that control fluid pressure can be again applied to the motor valve to open the same.

The same general type of operation applies to the high pressure pilot 12. Thus, when the controlled pressure C rises above the maximum value, the high pressure pilot vents motor valve 10 and interrupts the application of control pressure to it. Again, when the controlled pressure C falls below the maximum value, the high pressure pilot moves to non-venting position, thereby permitting control fluid to again be applied to the motor valve to open the same.

As stated above, motor valve 10 is of conventional type and has the usual imperforate diaphragm and with the above described type of operation, will be of the normally closed type (i.e. pressure opens, venting closes). However, it can be of the normally open type when suitable known reversing mechanism is used between the diaphragm and the valve element. Also, it is contemplated that piston type valves, etc. can be substituted as long as the pressure responsive element is non-perforate.

Before proceeding further with the over-all description, a detailed description of each of the high pressure and low pressure pilot valves will be given. Thus, the low pressure pilot valve 11 includes a valve body 12a having larger diameter and smaller diameter bores 13 and 14 therein. The valve body also has an inlet port 15, an outlet port 16 and a vent port 17. Controlling flow between these ports is a valve member 18 which is here illustrated as comprising a plunger carrying three axially spaced apart seals 19, 20 and 21 effecting a sliding seal with bore 14. The portions of the valve member between these seals can be reduced in cross-section to provide annular flow spaces 22 and 23. Thus with the valve member positioned as shown in FIG. 1 (herein termed non-venting position), fluid can flow from inlet port 15 to outlet port 16. When the valve member is shifted downwardly to its FIG. 2 (venting) position, seal 20 is positioned between the inlet and outlet ports and annular space 22 permits flow between outlet 16 and vent port 17. Movement of the valve member between its non-venting and venting positions can be limited by shoulders 24 and 25 which abut to limit movement in the venting direction and shoulders 26 and 27 which abut to limit movement in the non-venting direction.

Pressure responsive and resilient means are connected to the valve member in a manner to oppose each other. Then with the resilient means exerting a predetermined force on the valve member, the latter will be moved to non-venting position when a controlled pressure acting on the pressure responsive means exceeds the predetermined minimum value. The valve member, conversely, will move in an opposite direction to venting position when the controlled pressure falls below such minimum value.

Thus, the resilient means can take the form of a spring 28, which is connected via piston 29 to one end of the valve member. The other end of the spring is retained by retainer 30 carried by a spring-adjusting plug 31. The latter is threaded into an annular nut 32 which is provided with a lock nut 33 to maintain adjusting plug 31 in adjusted position. With this arrangement, it will be seen that nut 31 can be turned into or out of annular nut 32 to adjust the compressive force exerted by spring 28 on the valve member.

As here illustrated, the pressure responsive means comprises pistons 34 and 29. It will be seen that piston 34 is formed by an extension of the lower end of the valve member and sliding seal 21. Thus the sliding seal not only serves as a part of the piston but also prevents intermingling of control fluid and controlled fluid.

Piston 34 is reciprocal in bore 14 and defines a chamber 35 therein. This chamber is in fluid communication with the controlled pressure via a passage 36 in a support coupling 37 and a connector 38. With this arrangement, it will be seen that the controlled pressure can be exerted through passage 36 against piston 34 to apply a force thereto in opposition to the force of spring 28.

While the force applied by spring 28 can be adjusted over a fairly broad range by turning adjusting nut 31 as above described, there may be times when an even broader range is desired. To readily effect this, the larger piston 29 is arranged so that, when desired, controlled pressure can be made to act thereagainst to increase the net effective area urging valve member 18 toward non-venting position. Thus, a passageway, such as passageway 38 through valve member 18, communicates between chamber 35 and a chamber 39 defined in part by piston 29.

Figure 2:
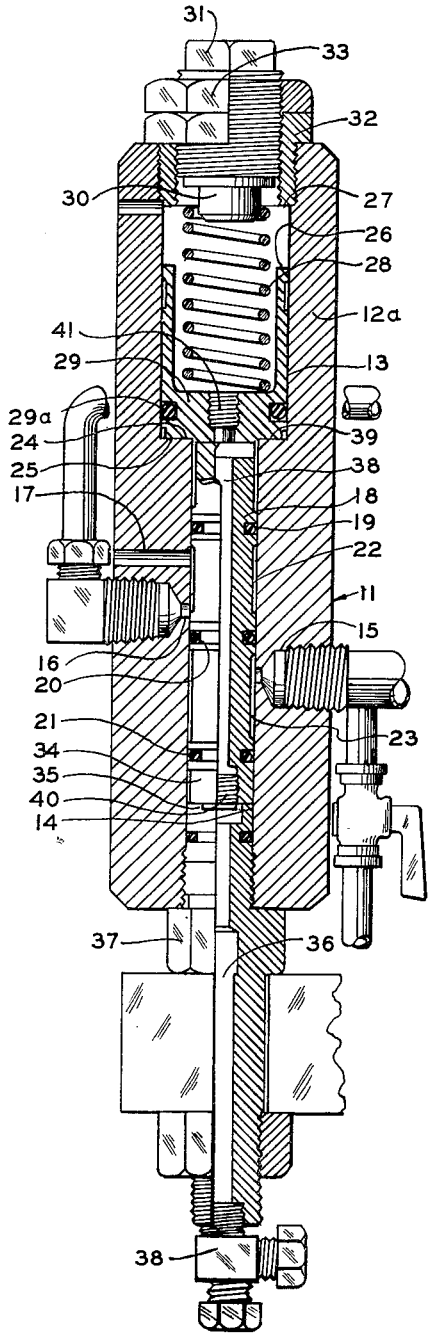
FIG. 2 is an enlarged view of the low pressure pilot valve shown in FIG. 1 but with the pilot valve in position to interrupt flow of control fluid to the motor valve and to vent the same.

When plug 40 is in position shown in FIG. 2, the controlled pressure is effective against only the area of piston 34. However, when plug 40 is moved to threaded opening 41, the controlled pressure acts via passage 38 and chamber 39 on the under side of piston 29 to urge it upwardly. With the plug in this position, it will be seen that the effective area urging the valve member upwardly will be that within sliding seal 29a, i.e., the cross-sectional area of bore 13. While it may be said that some of this effective area is actually physically disposed on piston 34, nevertheless the effective area of pressure responsive means 29 is that within seal 29a and it does not matter functionally where the surfaces constituting the area are physically situated. Accordingly, it will be understood that when it is said that one pressure responsive means has a larger area than another, such is meant to include the situation where one portion of the areas is common to both means. Also, it will be understood that passage 38 can be situated other than through the valve member such as in the valve body or even exteriorily thereof. However, the illustrated location is preferred for economy of manufacture.

Figure 3:
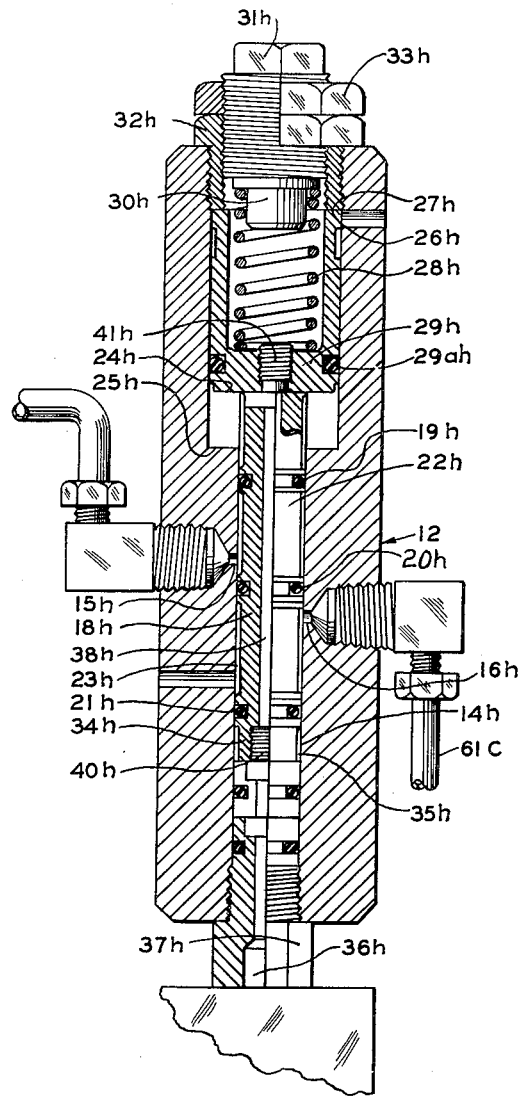
FIG. 3 is an enlarged view of the high pressure pilot valve of FIG. 1 with its parts positioned to interrupt control fluid flow to the motor valve and to vent the same.

The high pressure pilot valve illustrated in FIGS. 1 and 3 is of the same general construction as the low pressure pilot valve and hence the parts have been given like numbers except the suffix "h" has been added. It will be noted, however, that the inlet port 15h is spaced above vent port 17h and outlet port 16h. Accordingly, with the valve member 18h positioned as shown in FIG. 1 (non-venting position), inlet and outlet ports 15h and 16h will be in communication with each other while vent port 17h will be isolated from both. However, upon the controlled pressure increasing sufficiently to overcome the force of spring 28h, inlet port 15h will be isolated while vent port 17h and outlet port 16h will be in fluid communication with each other.

Referring now to the system shown generally in FIG. 1, a source of control fluid (e.g. gas) is provided and may be any suitable source having the desired pressure. This gas can be passed through a water separator 50 and a strainer 60 into a conduit 61. Conduit 61, containing pressure regulator 62, connects the high pressure pilot and the low pressure pilot in series. Thus, conduit 61 is connected to inlet 15 of the low pressure pilot and other sections 61a and 61b of this conduit connect the outlet port of the low pressure pilot to the inlet port of the high pressure pilot. The outlet port of the latter is, of course, connected by a conduit section 61c to motor valve 10 to apply control pressure fluid to the diaphragm or other pressure responsive member of the motor valve.

In operation, controlled pressure, which can be derived from the conduit or pipe controlled by motor valve 10, is exerted upon pistons 34 and 34h of the high and low pressure pilots. As long as the controlled pressure lies between preselected maximum and minimum values, the valve member of the low pressure pilot will be held in a non-venting (upper) position against force exerted by its spring 28 while the valve member of the high pressure pilot will be held in a non-venting (down) position by its spring 28h. Should the controlled pressure fall below the minimum value, spring 28 of the low pressure pilot moves its valve member downwardly to the FIG. 2 position to thereby cut off communication of the motor valve with the source of control fluid S. At the same time, the portion of conduit 61 (61a, 61b and 61c) downstream of the low pressure pilot is vented through vent port 17. This reduction in pressure on the motor valve permits it to close. As soon as the control pressure increases to be above the minimum value, the valve member of the low pressure pilot again moves to its FIG. 1 position, thereby again permitting control pressure from source S to move the motor valve to open position.

In a similar manner, increase of controlled pressure above the preselected maximum value causes the valve member of the high pressure pilot to move upwardly to venting position as shown in FIG. 3. This vents motor valve 10 and isolates it from the control fluid source S. As soon as the controlled pressure falls below the preselected maximum value, the high pressure pilot will return to its FIG. 1 position, thereby again permtiing control pressure to be applied to the motor valve to open the same.

It will be understood that the relative sizes of the various pressure responsive means, such as pistons 34 and 34h, and the strength of springs 28 and 28h can be adjusted so that the preselected maximum and minimum pressure values can be adjusted over a wide range. For example, in certain instances, it may be desirable that motor valve 10 be closed any time the controlled pressure falls below 100 pounds or rises about 500 pounds. This can be done simply by varying the strength of the springs relative to the sizes of the respective pressure responsive means (pistons 34 and 34h or pistons 29 and 29h.)

It is contemplated that resilient means other than springs can be used. Thus, pressure domes charged with a resilient fluid can be substituted as can rubber devices and the like. Also, it will be understood that while ports 16 and 16h are spoken of as "outlet" ports, they also serve as "inlet" ports during the venting of the motor valve. Also port 15h, herein termed an "inlet" port, serves as an "outlet" port when the low pressure pilot is in venting position. However, the terms "inlet" and "outlet" ports will be used herein to designate the direction of flow when the motor valve is connected to the control fluid source S even though flow direction through these ports may be reversed during venting. Similarly, the term "downstream" is used with reference to flow of control fluid when the same is flowing toward the motor valve and without reference to the direction of flow during venting. Further, the venting need not be to atmospheric pressure and will be understood as meaning a reduction of pressure sufficient to operate the motor valve even though the reduction is not to atmospheric pressure.

Figure 4:
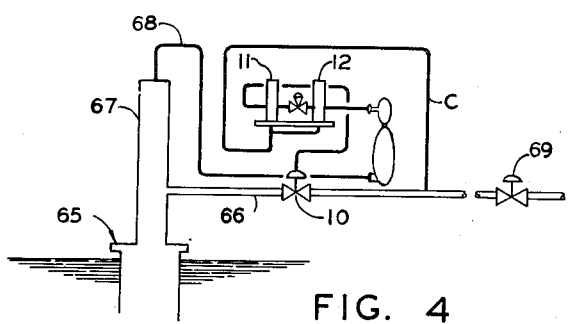
FIG. 4 is a schematic illustration of a system of this invention and illustrates the apparatus of FIG. 1 connected so that flow of fluid from a well can be remotely controlled.

While the apparatus of this invention will find many and varied uses, one particular advantageous use is illustrated in FIG. 4. In this system, a well 65 is shown producing oil through a flow line 66. The flow line contains motor valve 10 and, as illustrated schematically, the high and low pressure pilot valve control apparatus of FIG. 1 is mounted thereon. The source of gas S is here shown as being derived from a lubricator 67 and a supply conduit 68. Thus, gas separates from the oil and collects in the lubricator in a volume sufficient to operate motor valve 10 a number of times.

Flow line 66 can extend a considerable distance from well 65 and at any point remote from the well, there can be provided a means for controlling the pressure in the flow line such as valve 69. Also, the controlled pressure from C is taken from downstream of motor valve 10 but upstream of valve 69, preferably closely adjacent valve 10. With this arrangement, it will be seen that as long as valve 69 is open, motor valve 10 will be opened or closed, depending on the pressure of controlled fluid from C. When it is desired to shut motor valve 10, valve 69 can be closed, thereby causing the pressure from C to increase enough to move high pressure pilot 12 to venting position. Conversely, opening of valve 69 will permit motor valve 10 to open since the controlled pressure will fall below that required to hold pilot 12 in venting position. In this manner, the opening and closing of motor valve 10 is effected by control of a valve or other pressure controlling means at a point which can be far remote from the motor valve. This particular system does not require any connection between the control means 69 and motor valve 10 or the pilot valves other than the flow line 66 through which flow is being controlled.

The above system finds particularly advantageous use in off-shore oil wells where motor valve 10 and the pilot control system can be mounted on the wellhead. The motor valve can then be controlled by a valve 69 on the shore. It will also be noted that should flow line 66 break downstream of motor valve 10, the resultant drop in pressure in the flow line will cause the motor valve 10 to close, thereby preventing waste of oil. It should be appreciated that only a limited supply of control fluid (gas) will be required since the amount vented at each operation of the motor valve will be only that between the motor valve diaphragm and the pilot valve.

The apparatus of this invention has also found advantageous use in controlling the pressure applied to gathering lines in an automatically controlled lease production system. Thus, controllers can be set at the wellheads to protect the gathering lines from excessive pressures and also to shut in the well should one of the gathering lines break. When the lease tanks have become filled or flow of production is for any other reason stopped, it is necessary only to close a central control valve at the tanks. The resulting rise in pressure in the gathering lines upstream of this valve will cause the motor valves situated at wellheads all to close, thereby protecting the gathering system. When production is again desired, opening of the central control valve will cause all of the motor valves at the well heads to automatically open. This obviates the necessity of the pumper visiting each well each time production is started and stopped.

To reopen motor valve 10 after it is closed by low pressure the preferred method of operation is to obtain the necessary increase in pressure to C by use of a pump or high pressure gas to repressure flow line 66 through valve 69 down to motor valve 10. By this method complete remote control of motor valve 10 is achieved.

Manual control at the motor valve can be obtained by use of a by-pass line from the operating pressure line to the motor valve.

It will be appreciated that controlled pressure fluid source C can be connected upstream of motor valve 10 when the conduit downstream of the motor valve is to be protected against excessive pressures or when low and high pressure pilots are to be operated responsive to the source of controlled fluid to permit flow from the latter only when its pressure is within a preselected range. Also, the controlled fluid pressure source can be made entirely independent of the conduit controlled by motor valve 10 so that flow through such conduit is made dependent upon some variable other than pressure in the conduit.

In some instances, it is desired that motor valve 10 be opened and closed at time intervals, provided, however, that the controlled pressure C is within the range between predetermined maximum and minimum values. To effect this timed opening and closing, a three-way valve shown at 70, is inserted in the control pressure conduit between the high and low pressure pilots. Three-way valve includes a valve member 71 which, in an up position, seats against a vent 72 to close the same and in a down position, against a seat 73 to interrupt flow between conduit sections 61a and 61b. To effect movement of valve element 71, a timing means can be used. Here the timing means is schematically illustrated as including a timing mechanism 74 which raises and lowers an arm 75 at predetermined time intervals. When arm 75 is in an up position, the pressure from conduit section 61a moves valve element 71 upwardly to seat against and close vent 72. The control fluid can then flow from the low pressure pilot to the high pressure pilot as above described. However, when arm 75 moves downwardly, it moves element 71 downwardly to seat and interrupt flow from conduit 61a and at the same time to vent conduit 61b to atmosphere. This venting causes motor valve 10 to close. Assuming the controlled pressure is still within the desired range, subsequent upward movement of arm 75 will again close vent 72 and permit the application of control pressure to the motor valve to open the same.

Thus, it can be seen that the timing means and valve 70 provide a control which, with the high and low pressure pilots in non-venting position, opens and closes motor valve 10 at any preselected times. Such operation will continue as long as the controlled pressure is within the preselected range. However, should the controlled pressure be without this range, motor valve 10 will be closed by one of the pilots irrespective of the position of valve 70. As a result, even if the timing means positions valve 70 to open motor valve 10, such cannot happen unless the control pressure is within the preselected range.

From the foregoing it will be seen that this invention is one well adapted to attain all of the ends and objects hereinabove set forth, together with other advantages which are obvious and which are inherent to the apparatus and system.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for increasing and decreasing pressure applied to a pressure responsive mechanism upon a controlled pressure rising above a maximum value or falling below a minimum value comprising, in combination: first and second two-way pilot valves, each having a valve member movable to communicate an outlet port of its pilot valve alternately with an inlet port and with a vent port; conduit means connecting the outlet port of one pilot valve with the inlet port of another pilot valve; and means for moving said valve members, including for each valve member, a pressure responsive means and a resilient means connected to the valve member to apply opposing forces thereto; the relative size of the pressure responsive means and resilient means of each pilot valve being such that as the controlled pressure rises above and falls below said minimum value, said one pilot valve has its valve member moved to communicate its outlet port with its inlet port and with its vent port respectively, and as the controlled pressure rises above and falls below said maximum value, said other pilot valve has its valve member moved to communicate its outlet port with its vent port and with its inlet port respectively, whereby as long as the control pressure is without the range between said maximum and minimum values, pressure applied to a pressure responsive mechanism is reduced but upon the control pressure coming within said range, such applied pressure is increased.

2. The apparatus of claim 1 in combination with a two-way valve situated in said conduit means between said pilot valves, the two-way valve having a valve element movable to interrupt flow through said conduit means while venting the conduit means downstream thereof, and means for so moving the valve element.

3. The apparatus of claim 2 wherein said moving means includes a timing means for moving the valve element at preselected intervals.

4. The apparatus of claim 1 wherein the pressure responsive means of at least one of said pilot valves comprises portions of different effective areas, a passageway providing when open communication between said areas, and means for blocking and permitting flow through said passageway.

5. The apparatus of claim 1 wherein at least one of said pilot valves has its pressure responsive means in the form of pistons of different diameters and slidable in cylinders in the pilot valve, a passageway communicating when open between ends of said pistons which ends face in the same direction, and means for selectively preventing and permitting flow through said passageway.

6. An apparatus for causing a pressure actuated control valve to close upon a control pressure becoming higher or lower, respectively, than predetermined maximum and minimum values and causing said valve to be open while the controlled pressure is between said values, comprising, in combination: a control pressure conduit adapted to connect a source of control pressure fluid to said control valve, high and low pressure two-way pilot valves connected in series in said conduit and having valve members permitting, with both valve members in a first position, flow to said control valve and upon either valve member moving to a second position, interrupting flow through said conduit and causing it to be vented downstream of the pilot valve member in said second position, pressure responsive means adapted to be exposed to said controlled pressure and connected to said pilot valve members to urge the low pressure pilot valve member to said first position and the high pressure pilot valve member to said second position, and resilient means connected to oppose said pressure responsive means, the resilient means exerting forces such as to move the low pressure pilot valve member to said second position upon said controlled pressure falling below said minimum value and to maintain the high pressure pilot valve member in said first position until said controlled pressure exceeds said maximum value.

7. An apparatus for causing a pressure actuated control valve to close upon a controlled pressure becoming higher or lower, respectively, than predetermined maximum and minimum values and causing said control valve to be open while the controlled pressure is between said values comprising, in combination: high and low pressure pilot valves, each having inlet and outlet ports and a vent port, conduit means connecting the outlet port of one pilot valve with the inlet port of the other pilot valve, pressure responsive valve members in said pilot valves with each movable to switch fluid communication of the outlet port of its pilot valve between the inlet port and the vent port thereof, said pressure responsive valve members each being adapted to be exposed to said controlled pressure so that the high pressure pilot valve member is urged thereby to venting position and the low pressure pilot valve member is urged to a position to communicate the inlet port of the low pressure pilot valve with the outlet port thereof, and resilient means urging the valve members in a direction opposite that which they are urged by the controlled pressure, the resilient means exerting sufficient force to prevent movement of the high pressure pilot valve member to venting position until the controlled pressure exceeds said maximum value and causing movement of the low pressure pilot valve member to venting position only upon the controlled pressure falling below said minimum value.

8. A mechanism for causing the closing of a pressure actuated valve upon a controlled pressure becoming higher or lower than predetermined maximum and minimum values and causing opening of said valve when the controlled pressure is between said maximum and minimum values, comprising, in combination: a high pressure and a low pressure pilot valve, each having a pressure responsive valve member adapted to be exposed to said controlled pressure to be urged thereby toward a first position, first and second means for resiliently urging each of said valve members to a second position, the force exerted by said first and second resilient means being such that for controlled pressures above said minimum value, the controlled pressure holds the low pressure pilot valve member in said first position and for controlled pressures below said maximum value, the resilient means holds the high pressure pilot valve member in said second position, conduit means connecting said pilot valves in series for flow of a control fluid from a source through the pilot valves and to the pressure actuated valve, vents in each of the pilot valves, said valve members preventing communication between said conduit means and said vents while the high and low pressure pilot valve members are respectively in said first and second positions and providing such communication while the high and low pressure pilot valve members are respectively in said second and first positions.

9. An apparatus for changing the pressure applied to a pressure actuated mechanism responsive to a controlled pressure rising above a maximum value or falling below a minimum value comprising, in combination: a conduit for applying pressure from a fluid source to said mechanism; high and low pressure pilot valves connected in series in said conduit and each being actuatable to interrupt flow from said source to said mechanism while at the same time venting said mechanism, and means for individually actuating said high and low pressure pilot valves to so interrupt said flow and vent said mechanism, the high pressure pilot being so actuated upon said controlled pressure rising above said maximum value and the low pressure pilot being so actuated upon the controlled pressure falling below said minimum value.

10. In a system for remotely controlling the opening and closing of a pressure-actuated control valve in a flow conduit, a local source of pressure fluid, a pressure conduit connecting said source to said control valve, high and low pressure pilot valves connected in series in said pressure conduit and each being actuatable to interrupt flow from said source to said control valve while venting the pressure conduit downstream thereof, means for individually actuating said high and low pressure pilot valves to so interrupt said flow upon the pressure in said flow conduit downstream of the control valve respectively rising above a maximum value and falling below a minimum value, and a valve in said flow conduit at a position remote from said control valve whereby upon closing the remote valve, pressure in said flow conduit can increase to cause said high pressure pilot valve to close said control valve.

11. In a system for remotely controlling the opening and closing of a pressure actuated control valve in a flow conduit, a local source of pressure fluid, a pressure conduit connecting said source to said control valve, a plurality of pilot valves in said pressure conduit and each having a valve member actuatable to interrupt flow of fluid from said source to said control valve while venting the control valves, one of said pilot valves actuated by pressure in said conduit raising above a predetermined maximum value, another of the pilot valves actuated by pressure in said conduit falling below a predetermined value, pressure responsive means connected in fluid communication with said flow conduit downstream of said control valve and having a connection with each valve member to urge the same toward venting position, resilient means opposing the pressure responsive means and urging the valve member toward non-venting position, and means in said flow conduit remote from said control valve and pilot valve to change the pressure in said flow conduit from a pressure between the predetermined maximum and minimum pressure and thereby actuate said pilot valve to remotely control opening and closing of said control valve.

References Cited in the file of this patent

UNITED STATES PATENTS

| | | |
|---|---|---|
| 1,177,864 | Hogdon | Apr. 4, 1916 |
| 1,303,801 | Jones | May 13, 1919 |
| 1,574,234 | Cumner | Feb. 23, 1926 |
| 2,198,049 | Dinzl | Apr. 23, 1940 |
| 2,216,973 | Harrington | Oct. 8, 1940 |
| 2,700,981 | McLay | Feb. 1, 1955 |
| 2,731,032 | Hughes | Jan. 17, 1956 |

FOREIGN PATENTS

| | | |
|---|---|---|
| 92,927 | Germany | Jan. 8, 1896 |